Nov. 25, 1969 S. N. XENAKIS 3,480,826

TELEVISION RECEIVER HORIZONTAL SWEEP CIRCUIT
HAVING PROTECTION AGAINST ARCING
Filed Oct. 25, 1968

INVENTOR:
SABBAS N. XENAKIS,
BY Francis H. Boos, Jr.
HIS ATTORNEY.

United States Patent Office 3,480,826
Patented Nov. 25, 1969

3,480,826

TELEVISION RECEIVER HORIZONTAL SWEEP CIRCUIT HAVING PROTECTION AGAINST ARCING

Sabbas N. Xenakis, Portsmouth, Va., assignor to General Electric Company, a corporation of New York Filed Oct. 25, 1968, Ser. No. 770,621
Int. Cl. H01j *29/70*
U.S. Cl. 315—27 10 Claims

ABSTRACT OF THE DISCLOSURE

A horizontal sweep circuit for a television receiver is described which includes a high voltage transformer for developing a horizontal sweep current for supply to the horizontal deflection coils of a television receiver, cathode ray picture tube. The high voltage transformer comprises a primary winding that is supplied from a source of energizing potential under the control of a horizontal output transistor, and is inductively coupled to a high voltage tertiary winding. The high voltage tertiary winding is connected to a high voltage rectifier that serves to develop a high voltage direct current for application to the second anode of the cathode ray television picture tube. A protective circuit is provided for protecting the horizontal output transistor from overcurrent and overvoltage conditions that otherwise might be induced by transient arcing in the cathode ray picture tube and/or the high voltage rectifier. The protective circuit is comprised by a sensing resistor connected in series circuit relationship with the emitter-collector of the horizontal output transistor, and a clamping diode connected in parallel circuit relationship with the series circuit comprised by the sensing resistor and the emitter-base of the horizontal output transistor. In a preferred form of the invention, the horizontal sweep circuit further includes a horizontal buffer amplifier having its output coupled to and driving the horizontal output transistor, and having its input supplied from a source of horizontal sweep frequency signals. An intermediate voltage rectifying and smoothing circuit is coupled across at least a portion of the high voltage transformer primary winding for deriving an intermediate value operating voltage, and connections are provided for supplying the intermediate value operating voltage back to the horizontal buffer amplifier as an energizing potential to thereby provide adequate output drive for the horizontal output transistor.

BACKGROUND OF INVENTION

Field of invention

This invention relates to a new and improved horizontal sweep circuit for a television receiver which includes protection against undesired transient arcing in different portions of the receiver.

More particularly, the invention relates to a horizontal sweep circuit for a transistorized television receiver which provides a protective circuit arrangement for the horizontal output transistor of the receiver to prevent over-voltage or over-current conditions that otherwise might be imposed on the horizontal output transistor during undesired transient arcing occurring in different portions of the receiver, and that could lead to burn-out and/or failure of the horizontal output transistor.

Prior art problem

Present, commercial, transistorized television receivers generally employ a high voltage transformer arrangement that is excited from a relatively low voltage source of energizing potential under the control of a horizontal output transistor. The horizontal output transistor operates in conjunction wtih other components to develop a horizontal sweep current for driving the horizontal deflection coils of the television receiver cathode ray picture tube, and also a high voltage rectified direct current for application to the second anode of the cathode ray picture tube. The circuit arrangement is such that quite high voltages (10 to 12 kilovolts) and relatively large currents (up to 8 amperes), are developed in different parts of the sweep circuit. For this purpose, a substantial amount of inductance and capacitance is (in effect) coupled back to, and across the horizontal output transistor. As a consequence, in the event of transient disturbances, such as arcing in the cathode ray picture tube, or in the high voltage rectifier (due to dust, etc.) the current demand on the horizontal output transistor can become quite severe, and can result in its destruction. To prevent such current demands on the horizontal output transistor, the present invention was devised.

SUMMARY OF INVENTION

It is therefore a primary object of the invention to provide a new and improved horizontal sweep circuit for a television receiver which includes protective circuit means for curtailing the effect of undesired transient arcing in different portions of the receiver.

Another object of the invention is to provide a television receiver horizontal sweep circuit having the above set forth characteristics and which assures the supply of adequate output power drive to the horizontal output transistor.

In practicing the invention, a television receiver horizontal sweep circuit is provided which includes a high voltage transformer for developing a horizontal sweep current for supply to the horizontal deflection coils of the television receiver cathode ray picture tube. A horizontal output transistor is included for controlling energization of the high voltage transformer from a source of energizing potential. The high voltage transformer comprises a primary winding that is excited from the relatively low voltage source of energizing potential under the control of the horizontal output transistor, and that is inductively coupled to a high voltage tertiary winding. The high voltage tertiary winding in turn is connected to a high voltage rectifier for developing a high voltage direct current (on the order of ten to twelve kilovolts) that is supplied to the second anode of the cathode ray television picture tube. A protective circuit is also provided for protecting the horizontal output transistor from over-current and over-voltage conditions that otherwise might be induced by transient arcing occurring in the cathode ray picture tube and/or the high voltage rectifier. The protective circuit comprises a sensing resistor connected in series circuit relationship with the emitter-collector of the horizontal output transistor, and a clamping diode connected in parallel circuit relationship with the series circuit comprised by the sensing resistor and the emitter-base of the horizontal output transistor.

In a preferred embodiment of the invention, a horizontal sweep circuit constructed in the above-described manner further includes a horizontal buffer amplifier having its output coupled to and driving the horizontal output transistor, and having its input supplied from a source of horizontal sweep frequency signals. Intermediate voltage rectifying and smoothing circuit means are coupled across at least a portion of the high voltage transformer primary winding for deriving an intermediate value operating voltage, and means are provided for supplying the intermediate value operating voltage back to the horizontal buffer amplifier as an energizing potential to thereby provide improved drive for the horizontal output transistor. The improved drive for the horizontal output transistor coupled with the over-current, over-voltage protective circuit features makes available a greatly improved highly reliable horizontal sweep circuit.

BRIEF DESCRIPTION OF DRAWINGS

Other objects, features, and many of the attendant advantages of this invention will be appreciated more readily as the same becomes better understood by reference to the following detailed description when considered in connection with the accompanying drawings wherein like parts in each of the several figures are identified by the same reference character, and wherein.

DETAILED DESCRIPTION OF PREFERRED EMBODIMENTS

Figure 1:
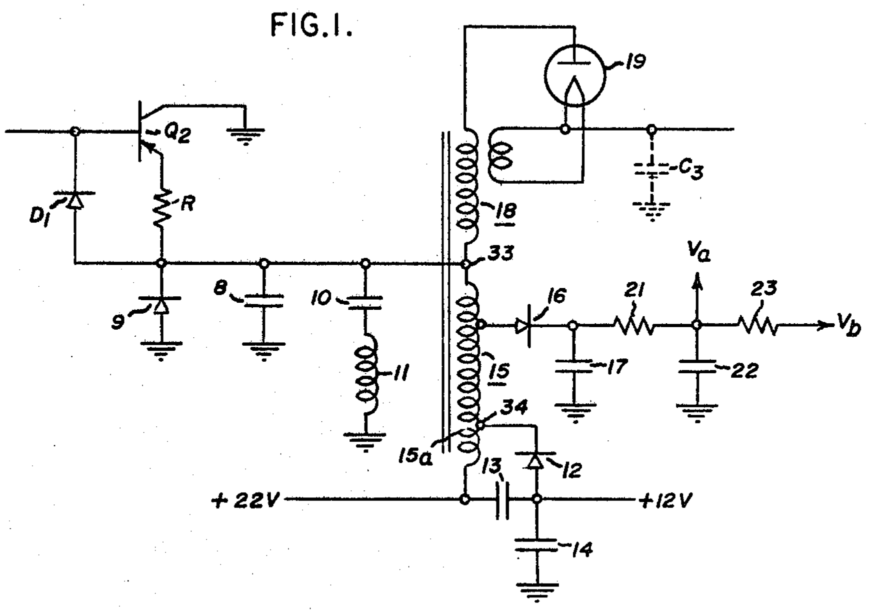
FIGURE 1 is a schematic circuit diagram of a new and improved horizontal sweep circuit for a television receiver constructed in accordance with the invention.

As is best seen in FIGURE 1 of the drawings, the horizontal sweep circuit according to the invention is comprised by a high voltage transformer having a primary winding 15 for developing a horizontal sweep current that is supplied to the horizontal deflection coils 11 of the television receiver cathode ray picture tube (not shown). For convenience, only the horizontal sweep circuit, or for that matter only the portion of the sweep circuit which is involved with the present invention, is shown in FIGURE 1. It is assumed, that a horizontal synchronizing sweep signal has been derived in prior stages of the television receiver by conventional circuitry, and is supplied to the base of the horizontal output transistor $Q_2$. Horizontal output transistor $Q_2$ is a PNP junction transistor having its collector grounded and its emitter connected through a sensing resistor R to a high voltage end of the high voltage transformer primary winding 15 which is defined by a junction point 33 of the primary winding 15 with a high voltage tertiary winding 18. The horizontal output transistor $Q_2$ operates to control energization of the high voltage transformer primary winding 15, or that portion of the winding between the junction 33 and an intermediate point 34 that is connected through a rectifying diode 12 to the positive terminal of a 12-volt battery source of energizing potential (not shown). The primary winding 15 is inductively coupled to the high voltage tertiary winding 18 which has its high voltage end connected to the anode of a high voltage rectifier tube 19 for developing a high direct current voltage (in the order of 10 to 12 kilovolts) that is supplied to the second anode of the television receiver cathode ray picture tube (not shown) but whose picture tube capacity is represented by the capacitor $C_3$.

The junction 33 of primary winding 15 and tertiary winding 18 also is connected to one terminal of a ringing capacitor 8 whose remaining terminal is grounded, to the cathode of a damping diode 9 whose anode is grounded, and to one terminal of a charging capacitor 10 connected in series circuit relationship with the horizontal deflection coil 11 of the television receiver cathode ray picture tube (not shown).

In addition to the above circuit elements, the embodiment of the invention shown in FIGURE 1 further includes an ancillary rectifying and smoothing circuit which in effect is connected to the junction 33 of the primary winding 15 and tertiary winding 18, and is comprised by a rectifying diode 16 and smoothing network including a capacitor 17, a resistor 21, a second capacitor 22, and a second resistor 23. With this arrangement, different value direct current potentials such as $V_a$ and $V_b$ may be obtained from the smoothing network at the points indicated.

The ancillary rectifying and smoothing circuit is designed in such a manner that the smoothing capacitor 17 (in effect) is connected through the sensing resistor R to the emitter of horizontal output transistor $Q_2$ and during operation of the circuit, will serve to limit the peak value of the collector to emitter voltage $V_{ce}$ of the horizontal output transistor $Q_2$.

In operation, the circuit of FIGURE 1 functions in the following manner: The horizontal sweep frequency synchronizing pulses developed in the prior stages of the television receiver and supplied to the base of the horizontal output transistor through a buffer transistor (not shown in FIGURE 1), cause the horizontal output transistor $Q_2$ to be turned on and off at the horizontal sweep frequency rate. While the horizontal output transistor $Q_2$ is turned off, the charging capacitor 10 will be charged to some predetermined value by current supplied from the 12-volt battery source through diode rectifier 12 and the portion of the high voltage transformer primary winding 15 between points 34 and 33, and by ringing oscillations from the ringing capacitor 8. Thereafter, at the beginning of the horizontal sweep frequency synchronizing pulse applied to the base of transistor $Q_2$, transistor $Q_2$ will be turned on. Upon transistor $Q_2$ being turned on, current will flow out of the charging capacitor 10 through transistor $Q_2$ and through the deflection coil 11 in a well known manner. Current flow through the deflection coil will be in accordance with the R–L time constant of the circuit, and produces a desired linear, horizontal sweep of the cathode ray picture tube beam across the face of the picture tube. At the end of the sweep, transistor $Q_2$ will be again turned off to initiate retrace and then a new sweep cycle.

Upon turn-off of horizontal output transistor $Q_2$, due to the magnetic field built up in deflection coil 11 prior to the time of turn-off of transistor $Q_2$, a current will be induced in the deflection coil 11 in accordance with Lenz' law which is supplied to the ringing capacitor 8 in a well known ringing oscillatory manner. The charge built up in the ringing capacitor 8 in then damped out by conduction of the damping diode 9, and a portion of the charge is returned to recharge charging capacitor 10 to a desired potential value and polarity. Any deficiency in the value of the charge built up on capacitor 10 is supplied from the 12-volt source through diode 12 and winding portion 15 in the previously described manner. This operation is then repeated periodically at the horizontal sweep frequency rate.

Concurrently with the above-described operation of the horizontal deflection coil 11, the current flowing in the high voltage transformer primary winding 15 is transformed by tertiary winding 18 to a high voltage at the end thereof connected to the high voltage rectifier 19. The high voltage rectifier 19 peak rectifies this high voltage and supplies the resulting high direct current voltage as an energizing potential to the second anode of the cathode ray picture tube (not shown), but whose picture tube capacity is depicted by the capacitor $C_3$. The operation of the overall circuit arrangement is such that quite high voltages (10 to 12 kilovolts) and large currents (up to 8 amperes) are developed in different parts of the horizontal sweep circuit.

As is quite evident from an examination of FIGURE 1, to develop the high voltages and large currents, a substantial amount of inductance and capacitance (in effect) is coupled back to and across the horizontal output transistor $Q_2$. As a consequence, in the event of transient disturbances, such as arcing across the cathode ray picture tube capacitor $C_3$, or arcing from the anode of high voltage rectifier 19 to ground, the current demand on horizontal output transistor $Q_1$ is greatly increased. This increased current demand also can saturate the core of the high voltage transformer 15, 18, thereby lowering the inductance of primary winding 15, and further increasing the current demand on transistor $Q_1$. In addition, when arcing from the anode of high voltage rectifier 19 to ground, occurs, the retrace interval is decreased, and results in materially increasing the voltage value of primary flyback pulse. As a consequence, either over-current or over-voltage conditions, or both, can be produced which can result in destruction of horizontal output transistor $Q_2$. The undesired arcing that results in conditions of this type being imposed on transistor $Q_2$, can be caused by the accumulation of dust, etc., is unpredictable, and is virtually impossible to prevent.

In addition to the above difficulties, should the high voltage rectifier 19 arc between its anode and filament, the stored energy in the picture tube capacitor $C_3$ is dumped into the leakage inductance of the tertiary winding 18 of the high voltage transformer. This produces a ringing oscillation with quite severe current peaks. Since this current can exceed, by a large amount, the current limit of the horizontal output transistor $Q_2$, the voltage across the collector-emitter of transistor $Q_2$ will build up at a rapid rate and can cause over-current, over-voltage or over-power dissipation conditions that likewise can be destructive to transistor $Q_2$.

In order to prevent the above described undesired conditions from destroying horizontal output transistor $Q_2$ or impairing its condition, the invention provides a protective circuit which is comprised in part by the sensing resistor R connected in the emitter-collector circuit of horizontal output transistor $Q_2$. The protective circuit means further includes a clamping diode $D_1$ which is connected in parallel circuit relationship with the series circuit comprised by the sensing resistor R and the emitter-base of the horizontal output transistor $Q_2$. The clamping diode $D_1$ (by design) has a forward voltage drop $V_{D1}$ which is of some finite higher value relative to the prescribed value of the base-emitter voltage of transistor $Q_2$. Accordingly, should the current in horizontal output transistor $Q_2$ start to rise above the predesigned safe value for any of the reasons enumerated above such as increased drain or dumping, the voltage across the sensing resistor R connected in the emitter circuit of transistor $Q_1$ also rises. This condition will be allowed to continue until the voltage drop $i$R across resistor R plus the emitter to base voltage $V_{eb}$ exceeds the forward voltage, $V_{D1}$, of clamping diode $D_1$ at which point clamping diode $D_1$ conducts, and clamps $i\mathrm{R}+V_{eb}$ to the forward voltage $V_{D1}$ of the clamping diode. By this arrangement, the maximum current flowing in the emitter of horizontal output transistor $Q_2$ is given approximately by the expression:

$$i_{\mathrm{e\ max.}}=\frac{V_{D1}-V_{eb}}{R}$$

In addition to the above described protective action of the protective circuit means comprised by sensing resistor R and clamping diode $D_1$, the smoothing capacitor 17 in the ancillary rectifying and smoothing circuit comprised by elements, 16, 17 and 21–23 will (because it is in effect essentially connected to the emitter of transistor $Q_2$) tend to maintain the voltage level of the emitter at or near the normal $V_{ce}$ peak level. Thus, both circuit features will cooperate to accommodate the horizontal sweep circuit to arcing conditions, and hence it is desirable that both features be included so that together they can accommodate all the various malfunctions that might occur.

Figure 2:
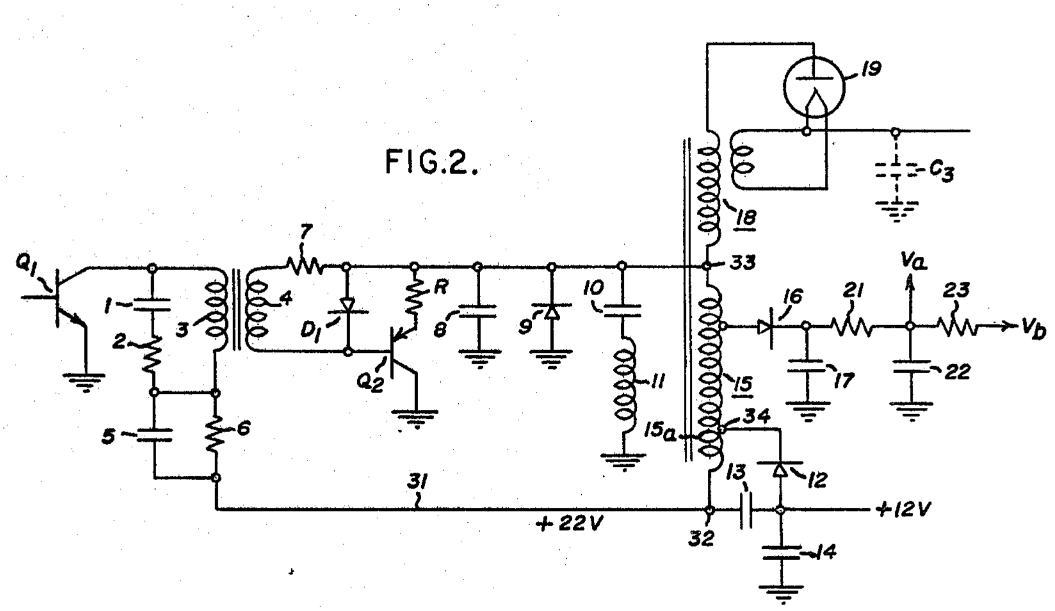
FIGURE 2 is a schematic circuit diagram of a preferred, modified embodiment of the invention which also includes further circuit connections for assuring adequate output power drive to the horizontal output transistor of the sweep circuit.

FIGURE 2 of the drawings shows a preferred form of horizontal sweep circuit constructed in accordance with the invention, which includes the protective circuit features described above with relation to FIGURE 1. In addition, the circuit arrangement of FIGURE 2 further includes an improved drive for the horizontal output transistor $Q_2$. This improved drive is achieved in the following manner. The horizontal synchronizing sweep signal derived in prior stages of the television receiver is supplied to the base of a horizontal buffer transistor $Q_1$.

Transistor $Q_1$ has its emitter connected directly to ground, and its collector connected to one end of the primary winding 3 of a coupling transformer having a secondary winding 4 inductively coupled to the primary winding 3. The remaining end of primary winding 3 is connected through a current limiting resistor 6 over a conductor 31 to a junction 32 of a winding portion 15*a* with a filter capacitor. 13. In addition, a capacitor 5 is connected in parallel circuit relationship with the current limiting resistor 6, and serves to bypass current components at the horizontal sweep frequency around the resistor 6 in order not to diminish the current pulse produced in the coupling transformer 3, 4. To prevent undesired ringing oscillations in the primary winding 3, a damping circuit comprised by a capacitor 1 and a series connected resistor 2, is connected in parallel circuit relationship across the primary winding 3.

In addition to the connection through diode 12 and primary winding 15 to the emitter of horizontal output transistor $Q_2$, the positive terminal of the 12-volt battery (not shown) is also connected to a filter capacitor 14, and to one terminal of a smoothing capacitor 13 whose remaining terminal is connected to the junction point 32. The arrangement is such that the diode rectifier 12 operates to rectify the voltage appearing across the winding portion 15*a*, and to build up a direct current voltage across the smoothing capacitor 13 which raises the potential of juncture point 32 to a value which is intermediate between the low, 12-volt value of the battery supply, and the higher voltage developed across the primary winding 15. Thus, it will be appreciated that the diode rectifier 12 in conjunction with smoothing capacitor 13 comprises an intermediate voltage rectifying and smoothing circuit for developing an intermediate value voltage of about 22 volts at the juncture point 32 to which the collector of horizontal buffer transistor $Q_1$, is connected.

In the past, difficulty has been encountered in the operation of the horizontal sweep circuit due to the fact that insufficient drive has been available to cause the horizontal output transistor $Q_2$ to turn off in a sufficiently short period of time to prevent damage from buildup in reapplied voltage $V_{ce}$, concurrently with a large value of collector current flowing in the transistor. For a more detailed description of the problem, and the construction and operation of improved drive circuit, reference is made to copending application Ser. No. 770,620 (General Electric patent, filed October 25, 1968, S. N. Xenakis, inventor, entitled "Improved Drive for Television Receiver Horizontal Sweep Circuit Output Transistor," and assigned to the General Electric Company. By returning the collector of the buffer transistor $Q_1$ to the +22 volt intermediate voltage that exists at the juncture 32, sufficient turn-off voltage is made available across the base-emitter junction of the horizontal output transistor $Q_2$. This results in producing adequate base peak-reverse current $I_{pkr}$ at the beginning of turn-off of transistor $Q_2$ so as to reduce the collector current $i_c$ of transistor $Q_2$ rapidly enough to prevent coincident existence of high collector current $i_c$ and high collector to emitter voltage $V_{ce}$ thereby protecting horizontal output transistor $Q_2$ from failure due to this cause. By incorporating this circuit feature along with the above-described protective circuit features, a greatly improved, highly reliable, television receiver, horizontal sweep circuit is made available.

From the foregoing description, it will be appreciated that the invention provides a new and improved horizontal sweep circuit for a television receiver which includes protective circuit means for curtailing the effect of undesired transient arcing in different portions of the receiver. In addition, the invention makes available an improved television receiver horizontal sweep circuit having the above set forth characteristics and which assures the supply of adequate output power drive to the horizontal output transistor from the horizontal buffer amplifier.

Having described two embodiments of a new and improved television receiver horizontal sweep circuit constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed is:

1. In a horizontal sweep circuit for a television receiver including a high voltage transformer for developing a horizontal sweep current for supply to the horizontal deflection coils of a cathode ray picture tube and a horizontal output transistor for controlling energization of the high voltage transformer from a source of energizing potential, the high voltage transformer comprising a primary winding inductively coupled to a high voltage tertiary winding that in turn is connected to a high voltage rectifier for developing high voltage direct current that is supplied to the second anode of the cathode ray television picture tube for energizing the same, the improvement comprising protective circuit means for protecting the horizontal output transistor from over-current and over-voltage conditions otherwise induced by transient arcing in the cathode ray picture tube and/or high voltage rectifier, said protective circuit means comprising a sensing resistor connected in series circuit relationship with the emitter-collector of said horizontal output transistor and a clamping diode connected in parallel circuit relationship with the series circuit comprised by the sensing resistor and the emitter-base of the horizontal output transistor.

2. A horizontal sweep circuit according to claim 1 wherein the clamping diode has a forward voltage drop $V_{D1}$ which is equal to the sum of the emitter to base voltage $V_{eb}$ of the horizontal output transistor plus the voltage drop across the sensing resistor which has a resistance value R whereby the maximum current $i_{e\,max}$ flowing in the emitter of the horizontal output transistor is given by the expression:

$$i_{e\,max.}=\frac{V_{D1}-V_{eb}}{R}$$

3. A horizontal sweep circuit according to claim 2 wherein the horizontal output transistor comprises a PNP junction transistor and the clamping diode has its cathode connected to the base of the horizontal output transistor and its anode connected to the terminal of the sensing resistor remote from the emitter of the horizontal output transistor.

4. A horizontal sweep circuit according to claim 2 further including ancillary rectifying and smoothing circuit means connected to the high voltage end of the primary winding of the high voltage transformer with the horizontal output transistor having its emitter effectively connected through the sensing resistor to the same high voltage end of the primary winding, the ancillary rectifying and smoothing circuit means including a smoothing capacitor that further serves to limit the peak value of the collector to emitter voltage $V_{ce}$ of the horizontal output transistor.

5. A horizontal sweep circuit according to claim 4 wherein the low voltage end of the tertiary winding of the high voltage transformer is connected to the same high voltage end of the primary winding to which the horizontal output transistor has its emitter connected through the sensing resistor, the high voltage end of the tertiary winding being connected through the high voltage rectifier to supply high voltage rectified direct current potential to the cathode ray picture tube.

6. A horizontal sweep circuit according to claim 5 wherein the source of energizing potential has one terminal grounded and the remaining terminal connected to the low voltage end of the high voltage transformer primary winding, the horizontal deflection coil of the cathode ray picture tube is connected in series circuit relationship with a charging capacitor between ground and the high voltage end of the high voltage transformer primary winding, a ringing capacitor and a damping diode are connected in parallel circuit relationship with each other and with the series circuit comprised by the horizontal deflection coil and series connected charging capacitor and the collector of the horizontal output transistor is grounded.

7. A horizontal sweep circuit according to claim 6 wherein the horizontal output transistor comprises a PNP junction transistor and the clamping diode has its cathode connected to the base of the horizontal output transistor and its anode connected to the terminal of the sensing resistor remote from the emitter of the horizontal output transistor.

8. A horizontal sweep circuit according to claim 6 further including horizontal buffer amplifier means having the output thereof coupled to and driving the horizontal output transistor and having the input thereof supplied from a source of horizontal sweep frequency signals, intermediate voltage rectifying and smoothing circuit means coupled across at least a portion of said high voltage transformer primary winding for deriving an intermediate value operating voltage therefrom, and means for supplying the intermediate value operating voltage thus derived back to said horizontal buffer amplifier means as an energizing potential to thereby provide improved drive for the horizontal output transistor.

9. A horizontal sweep circuit according to claim 8 wherein the horizontal output transistor comprises a PNP junction transistor and the clamping diode has its cathode connected to the base of the horizontal output transistor and its anode connected to the terminal of the sensing resistor remote from the emitter of the horizontal output transistor.

10. A horizontal sweep circuit according to claim 2 further including horizontal buffer amplifier means having the output thereof coupled to and driving the horizontal output transistor and having the input thereof supplied from a source of horizontal sweep frequency signals, intermediate voltage rectifying and smoothing circuit means coupled across at least a portion of said high voltage transformer primary winding for deriving an intermediate value operating voltage therefrom, and means for supplying the intermediate value operating voltage thus derived back to said horizontal buffer amplifier means as an energizing potential to thereby provide improved drive for the horizontal output transistor.

References Cited

UNITED STATES PATENTS

| | | | |
|---|---|---|---|
| 3,185,888 | 5/1965 | Schneider | 315—27 |
| 3,343,061 | 9/1967 | Hetterscheid | 315—27 X |
| 3,411,032 | 11/1968 | Chi-Sheng Liu | 315—27 |

RODNEY D. BENNETT, Jr., Primary Examiner

JOSEPH G. BAXTER, Assistant Examiner